United States Patent [19]
Davis et al.

[11] Patent Number: 6,131,397
[45] Date of Patent: Oct. 17, 2000

[54] SLUSH PRODUCING PROCESS AND DEVICE

[75] Inventors: John E. Davis, Claremont; Tibor I. Lak, Huntington Beach; Gene Rogers, San Pedro; James F. Weber, Moorpark; Michael V. Merlin, Anaheim; Timothy L. Gaynor, III, Cypress; David L. Gerhardt, Redondo Beach, all of Calif.

[73] Assignee: Boeing North American Inc., Seal Beach, Calif.

[21] Appl. No.: 09/262,787

[22] Filed: Mar. 4, 1999

[51] Int. Cl.[7] .......................................... F17C 5/00
[52] U.S. Cl. .................................. 62/54.1; 62/7; 62/47.1
[58] Field of Search ................................ 62/7, 46.1, 47.1, 62/54.1

[56] References Cited

U.S. PATENT DOCUMENTS

| | | |
|---|---|---|
| 2,640,627 | 6/1953 | Doelter . |
| 3,389,555 | 6/1968 | Goldstein et al. . |
| 3,393,152 | 7/1968 | Smith et al. ............................. 62/46.1 |
| 3,455,117 | 7/1969 | Prelowski ................................ 62/54.1 |
| 5,220,801 | 6/1993 | Butler et al. .................................. 62/7 |
| 5,315,530 | 5/1994 | Gerhardt et al. . |
| 5,398,515 | 3/1995 | Lak . |

OTHER PUBLICATIONS

Vented Tank Resupply Experiment (VTRE); http://zeta.lerc.nasa.gov/EXPR2/vtre,HTM; Nov. 14, 1998.

Primary Examiner—Ronald Capossela
Attorney, Agent, or Firm—Stout, Uxa, Buyan & Mullins, LLP; Donald E. Stout

[57] ABSTRACT

Slush is made from a liquid using slush making systems or according to slush making processes. A jacketed vessel of the processes and the systems has an interior wall that defines an interior space. The interior space comprises a top and a bottom. The interior space has an average overall cross-sectional area taken through a vertical axis extending generally between the top and the bottom. The interior space also has a collection portion having an average collection portion cross-sectional area taken through the vertical axis that is less than the average overall cross-sectional area. The liquid is placed into the interior space and the interior walls are cooled. Slush forms on the interior walls and migrates to the collection portion. The collection portion is located at the interior space bottom when the slush density is higher than the liquid density and the collection portion is located at the interior space top when slush density is less than the liquid density. To facilitate the migration of the slush to the collection portion, at least a conical portion of the interior space has the general shape of a cone and the collection portion is located in the proximity of an apex of the conical portion, thereby helping to funnel the slush to the collection portion. The cryogenic liquid to be made into slush may be oxygen, nitrogen, hydrogen, helium, or water. The slush may be used to densify cryogenic liquids, such as cryogenic liquid propellants.

29 Claims, 1 Drawing Sheet

SLUSH PRODUCING PROCESS AND DEVICE

BACKGROUND OF THE INVENTION

1. Field of the Invention

This invention relates to cooling processes and, more specifically, to processes that make slush.

2. Description of the Related Art

The prior art discloses many cooling devices and processes for cooling liquids. The prior art also discloses many devices and processes for densifying liquids. A need exists, however, for devices and methods that are simple and robust to cool liquids into slush and use the slush to density other liquids. This need is especially pertinent in the field of cooling and densifying cryogenic liquids, such as cryogenic liquid propellants.

SUMMARY OF THE INVENTION

In an aspect of the invention, a cooling process for producing a slush with a slush density from a liquid with a liquid density has the step of providing a cooling device comprising an interior wall that defines an interior space. The interior space comprises a top and a bottom. The interior space has an average overall cross-sectional area taken through a vertical axis extending generally between the top and the bottom. Tithe interior space also has a collection portion having an average collection portion cross-sectional area taken through the vertical axis that is less than the average overall cross-sectional area. In another step, the liquid is placed into the interior space. Another step in the cooling process is to change the density of a portion of the liquid to produce the slush through cooling at least a portion of interior wall and, whereby, at least a portion of the slush accumulates in the collection portion. In an additional step of the process, the slush portion is removed from the collection portion.

In a further aspect of the cooling process, the collection portion is located at the interior space bottom when the slush density is higher than the liquid density and the collection portion is located at the interior space top when slush density is less than the liquid density. In a still further aspect of the invention, at least a conical portion of the interior space has the general shape of a cone and the collection portion is located in the proximity of an apex of the conical portion.

In a further aspect of the invention, the interior space pressure is increased or decreased.

In a further aspect of the invention, the pressure of the slush portion is changed. In a still further aspects of the invention, the slush portion pressure may be changed before or after the slush is removed from the collection portion. In an additional aspect of the invention, the thermal energy of the slush portion is reduced after changing the slush portion pressure and the slush portion may be depressurized later.

In a further aspect of the invention, the slush portion is used to densify a cryogenic liquid. In aspects of the invention, the cryogenic liquid may be a propellant.

In further aspects of the invention, the liquid may comprise oxygen, nitrogen, hydrogen, helium, or water.

In further aspects of the invention, the cooling process may be performed as a batch, semi-batch, or continuous process.

In an aspect of the invention, a first cryogenic liquid densification process comprises the steps of combining the first cryogenic liquid with a second cryogenic liquid that is at least partially solidified, wherein the first and second cryogenic liquids are of at least compatible chemical compositions. In a further aspect of the invention, the first cryogenic liquid is a propellant.

In an aspect of the invention, a slush producing device comprises a jacketed vessel, an inlet, a pressurization valve, and an outlet. The jacket vessel has an interior space with a top and a bottom. The interior space has an average overall cross-sectional area taken through a vertical axis extending generally between the top and the bottom. The interior space also has a collection portion having an average collection portion cross-sectional area taken through the vertical axis that is less than the average overall cross-sectional area. The interior space has a remainder portion that is the region of the interior space next to the collection portion. The inlet receives an inlet flow into the interior space. The pressure isolation valve is between the collection portion and the remainder portion of the interior space. The outlet enables an outlet flow to exit the collection portion.

In further aspects of the invention, at least a conical portion of the interior space has the general shape of a cone and the collection portion is located in the proximity of an apex of the conical portion. The conical portion apex may be in either the bottom or the top of the interior space.

In a further aspect of the invention, a cooling device is disposed about the collection portion.

In a further aspect of the invention, the interior space remainder portion is enclosed and pressurizable to a different pressure than the collection portion.

In further aspects of the invention, the device outlet may be functionally connected to an inlet of a cryogenic liquid tank or a cryogenic liquid propellant tank.

In an aspect of the invention, a slush producing system has a jacketed vessel and a pressurization device. The jacketed vessel comprises a vessel interior space comprising a top and a bottom, an average overall cross-sectional area taken through a vertical axis extending generally between the top and the bottom, and a collection portion having an average collection portion cross-sectional area taken through the vertical axis that is less than the average overall cross-sectional area. The jacketed vessel also has an inlet into the vessel interior space and an outlet from the collection portion. The pressurization device comprises a pressurizable interior space with an inlet and an outlet. The pressurization device inlet is functionally connected to the jacketed vessel outlet.

In further aspects of the invention, at least a conical portion of the vessel interior space has the general shape of a cone and the collection portion is located in the proximity of an apex of the conical portion and either the top or the bottom of the vessel interior space.

In a further aspect of the invention, the pressurization device comprises a cooling jacket about at least a portion of the pressurizable interior space of the pressurization device.

In further aspects of the invention, a pressurization device outlet is functionally connected to an inlet of a cryogenic liquid tank or a cryogenic liquid propellant tank.

DESCRIPTION OF THE PREFERRED EMBODIMENTS

Figure 1:
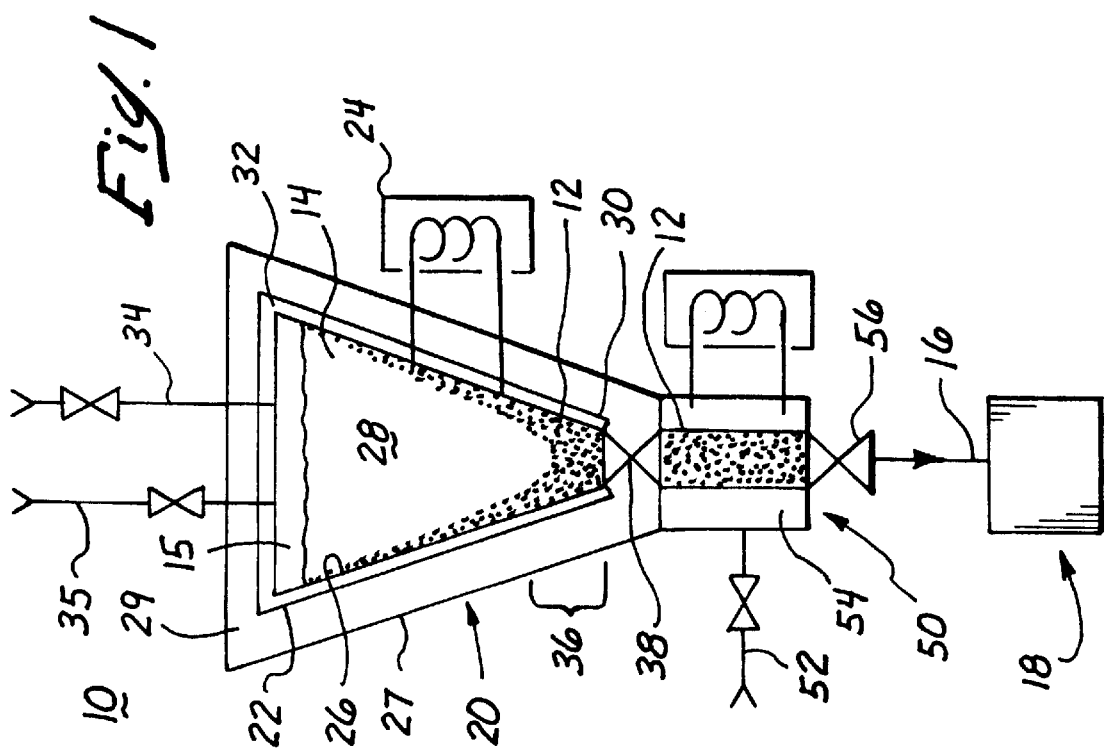
FIG. 1 shows a section view of a slush producing system according to an embodiment of the invention.

Referring now to the figures, wherein like reference numerals refer to like elements throughout the figures, and referring specifically to FIG. 1, a slush producing system 10 produces a slush 12 from a liquid 14 through removal of thermal energy. The slush 12 is a part solid/part liquid mixture. Some of the possible liquids 14 include oxygen, nitrogen, hydrogen, helium, water, and various compounds and mixtures.

The slush 12 may be used in many applications. In the shown embodiment, the slush 12 is directed in flow 16 to be placed in a cryogenic liquid propellant tank 18 to assist in the densification of the liquid propellant therein, such as described in U.S. Pat. No. 5,644,920 to Lak et al. entitled "Liquid Propellant Densification," and incorporated herein by reference in its entirety. Other embodiments of the invention may direct the slush to any type of cryogenic liquid tank or to any application that may benefit from using the produced slush.

In the shown and preferred embodiment of the invention, the slush producing system 10 comprises an insulated vessel 20 having an intermediate jacket 22 surrounding an interior wall 26. The intermediate jacket 22 is thermally connected to a temperature control device 24 to control the temperature of the vessel interior wall 26 of the vessel 20. Other embodiments of the invention may have other ways of adjusting the temperature of the vessel interior wall 26, including layers of inner jackets with independent thermally connected temperature control devises. Other embodiments of the invention may have the inner jacket 22 zoned to withdraw thermal energy at differing rates from different portions of the interior wall 26.

In the shown embodiment of the invention, an outer jacket 27 surrounds the intermediate jacket 22. The outer jacket 27 provides another layer of insulation for the insulated vessel 20. In an embodiment of the invention, the insulation of the outer jacket 27 is provided in the form of a partial vacuum or essentially a vacuum in the space 29 between the intermediate and outer jackets. Other embodiments of the invention may have other forms of insulation in the outer jacket 27, may have multiple outer jackets, or may not have an outer jacket.

The vessel interior wall 26 defines an inverted cone-shaped interior 28 with an apex 30 below a base 32. The inverted position of the interior 28 is used in slush producing devices 10 that produce slush 12 having a slush density greater than a density of the liquid 14, which applies to oxygen, nitrogen, hydrogen, and helium. Interiors of vessels in other embodiments of the invention may have the apex above the base for use with water, which has a liquid density greater than the density of slush made from water.

The vessel 20 has a liquid feed 34 and a gas feed 35. The liquid feed 34 is directing liquid 14 into the vessel interior 28 through the vessel base 32. The gas feed 35 is for directing and/or removing gas 15 from the vessel interior 28. The gas 15 is used to control the pressure of the interior pressure of the vessel 20. Other embodiments of the invention may have multiple liquid and gas feeds, may have the feeds at other locations, and may have separate gas lines for feeding gas 15 to the vessel 20 and removing gas 15 from the vessel. Other embodiments of the invention may use a liquid for changing the pressure of the vessel interior 28. The pressure adjusting gas 15 or liquid in embodiments of the invention may be similar or dissimilar to the liquid 14 in the vessel interior 28. Other embodiments of the invention may have other ways to adjust the pressure in the vessel interior 28, such as a diaphragm or piston for changing the volume of the vessel interior.

As the jacket 22 cools the vessel interior wall 26, the removal of thermal energy from the liquid in the proximity of the wall result in slush 12 forming. As a result of the pitch of the vessel wall 26, the slush moves downward to a collection portion 36 of vessel interior 28 at the apex 30. The slush 12 in the collection portion 36 of the vessel interior 28 exits through a valve 38 at the apex 30.

The slush 12 is directed out of the vessel interior 28 and into a pressurization chamber 50 in the shown embodiment. Other embodiments of the invention may not have a pressurization chamber 50. The slush 12 in the pressurization chamber 50 may be pressurized by the introduction of gas or liquid through a pressurization line 52. Other embodiments of the invention may have a pressurization chamber that pressurizes the slush 12 through mechanical compaction or other means.

In the shown embodiment, the pressurization chamber 50 has a jacketed exterior 54 to remove additional thermal energy from the slush 12 in the chamber. Other embodiments of the invention may have other ways of removing thermal energy from the slush in the pressurization chamber 50. The slush 12 exits the pressurization chamber 50 through an exit valve 56 and is directed to the cryogenic liquid tank 18. In some embodiments of the invention, the pressurization and/or additional removal of thermal energy from the slush 12 in the pressurization chamber 50 may substantially convert the slush to a solid.

Figure 2:
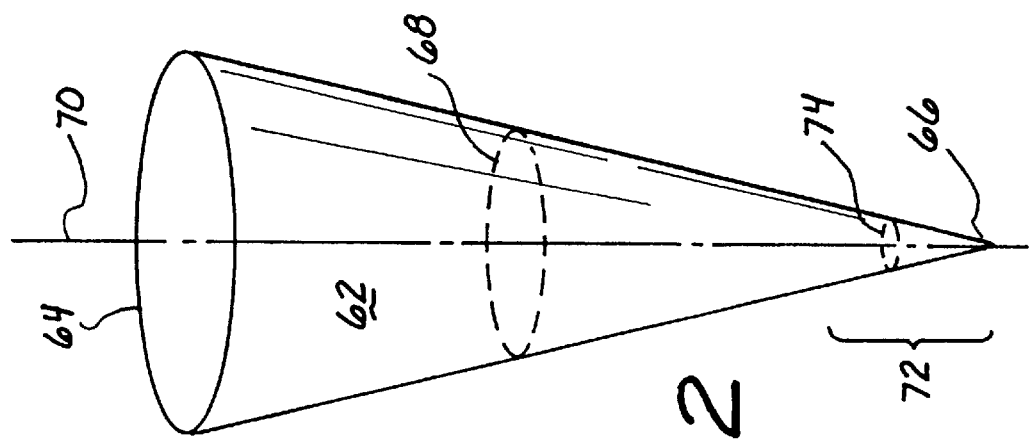
FIG. 2 shows a perspective view of an interior of a vessel in the slush producing system of FIG. 1.

Referring now to FIG. 2, an inverted cone 60 represents the vessel interior 28 in three dimensions. The overall volume 62 of the cone 60 extends from the base 64 to the apex 66. The overall volume 62 has an average overall cross-sectional area 68 taken through a vertical axis 70 extending generally between the base 64 and the apex 66. The collection portion 72 has an average collection portion cross-sectional area 74 that is less than the average overall cross-sectional area 68. The difference in average cross-sectional areas 68 and 74 enable slush 12 formed on the vessel interior wall 26 to move down the wall and collect in the collection portion 72 in this embodiment. As previously stated, the vessel interior 62 would have the collection portion 72 above the base 64 for substances such as water that has a greater density in a liquid state compared to its solid state.

Other embodiments of the invention may have vessel interiors of other shapes, such as ellipsoidal, cylindrical with a conical end for the collection portion, pyramidal, tetrahedral, and a portion of a sphere. Other embodiments may have irregular surfaces for funneling the slush to the collection portion or for increased surface area for greater heat transfer between the liquid and the vessel walls.

Embodiments of the invention may produce the slush as a batch, semibatch, or continuous process. Embodiments of the invention may also include interior wall scrapers, agitators, or augurs to assist in moving and directing the slush to the collection portion.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A cooling process for producing a slush with a slush density from a liquid with a liquid density comprising the steps of:

a. providing a cooling device comprising an interior wall that defines an interior space comprising:

i. a top and a bottom;
    ii. an average overall cross-sectional area taken through a vertical axis extending generally between the top and the bottom; and
    iii. a collection portion of the interior space having an average collection portion cross-sectional area taken through the vertical axis that is less than the average overall cross-sectional area;
  b. placing the liquid in the interior space;
  c. changing the density of a portion of the liquid to produce the slush through cooling at least a portion of interior wall and, whereby, at least a portion of the slush accumulates in the collection portion; and
  d. removing the slush portion from the collection portion.

2. The cooling process of claim 1, wherein the collection portion is located at the interior space bottom when the slush density is higher than the liquid density and the collection portion is located at the interior space top when slush density is less than the liquid density.

3. The cooling process of claim 2, wherein at least a conical portion of the interior space has the general shape of a cone and the collection portion is located in the proximity of an apex of the conical portion.

4. The cooling process of claim 1, further comprising the step of changing an interior space pressure, wherein the interior space of the cooling device is pressurizable or depressurizable.

5. The cooling process of claim 1, further comprising the step of changing the pressure of the slush portion.

6. The cooling process of claim 5, wherein the changing the pressure step occurs before the removing step.

7. The cooling process of claim 5, wherein the changing the pressure step occurs after the removing step.

8. The cooling process of claim 5, further comprising the step of reducing thermal energy from the slush portion after the changing the pressure step.

9. The cooling process of claim 8, further comprising the step of depressurizing the slush portion after the reducing thermal energy step.

10. The cooling process of claim 1, further comprising the step of using the slush portion to densify cryogenic liquid propellant.

11. The cooling process of claim 10, wherein the using the slush portion step comprises the step of placing the slush portion in a tank for holding the cryogenic liquid propellant.

12. The cooling process of claim 1, further comprising the step of using the slush portion to densify cryogenic liquid propellant.

13. The cooling process of claim 1, wherein the liquid comprises cryogenic liquid oxygen, cryogenic liquid nitrogen, cryogenic liquid hydrogen, or cryogenic liquid helium.

14. The cooling process of claim 1, wherein the liquid is cryogenic liquid propellant.

15. The cooling process of claim 1, wherein the liquid comprises water.

16. The cooling process of claim 1, comprising the step of coordinating the placing the liquid step, changing the density step, and the removing the slush portion step to be performed as a batch, semi-batch, or continuous process.

17. A slush producing device comprising:
  a. a jacketed vessel having an interior space comprising:
    i. a top and a bottom;
    ii. an average overall cross-sectional area taken through a vertical axis extending generally between the top and the bottom;
    iii. a collection portion of the interior space having an average collection portion cross-sectional area taken through the vertical axis that is less than the average overall cross-sectional area; and
    iv. a remainder portion of the interior space that is the region of the interior space next to the collection portion;
  b. an inlet for receiving an inlet flow into the interior space;
  c. a pressure isolation valve between the collection portion and the remainder portion of the interior space; and
  d. an outlet for enabling an outlet flow to exit the collection portion.

18. The slush producing device of claim 17, wherein at least a conical portion of the interior space has the general shape of a cone and the collection portion is located in the proximity of an apex of the conical portion and the bottom of the interior space.

19. The slush producing device of claim 17, wherein at least a conical portion of the interior space has the general shape of a cone and the collection portion is located in the proximity of an apex of the conical portion and the top of the interior space.

20. The slush producing device of claim 17, further comprising a cooling device about the collection portion.

21. The slush producing device of claim 17, wherein the interior space remainder portion is enclosed and pressurizable to a different pressure than the collection portion.

22. The slush producing device of claim 17, wherein the outlet is functionally connected to an inlet of a cryogenic liquid tank.

23. The slush producing device of claim 17, wherein the outlet is functionally connected to an inlet of a cryogenic liquid propellant tank.

24. A slush producing system comprising:
  a. a jacketed vessel comprising:
    i. a vessel interior space comprising a top and a bottom, an average overall cross-sectional area taken through a vertical axis extending generally between the top and the bottom, and a collection portion having an average collection portion cross-sectional area taken through the vertical axis that is less than the average overall cross-sectional area;
    ii. an inlet for receiving an inlet flow into the vessel interior space; and
  b. a pressurization device comprising a pressurizable interior space with an inlet and an outlet, the inlet being functionally connected to the jacketed vessel outlet.

25. The slush producing system of claim 24, wherein at least a conical portion of the vessel interior space has the general shape of a cone and the collection portion is located in the proximity of an apex of the conical portion and the bottom of the vessel interior space.

26. The slush producing system of claim 24, wherein at least a conical portion of the vessel interior space has the general shape of a cone and the collection portion is located in the proximity of an apex of the conical portion and the top of the vessel interior space.

27. The slush producing system of claim 24, wherein the pressurization device comprises a cooling jacket about at least a portion of the pressurizable interior space of the pressurization device.

28. The slush producing system of claim 24, wherein a pressurization device outlet is functionally connected to an inlet of a cryogenic liquid tank.

29. The slush producing system of claim 24, wherein a pressurization device outlet is functionally connected to an inlet of a cryogenic liquid propellant tank.

* * * * *